(12) United States Patent
Gupta et al.

(10) Patent No.: US 12,045,582 B2
(45) Date of Patent: Jul. 23, 2024

(54) MULTI-DIMENSIONAL FFT COMPUTATION PIPELINED HARDWARE ARCHITECTURE USING RADIX-3 AND RADIX-$2^2$ BUTTERFLIES

(71) Applicant: TEXAS INSTRUMENTS INCORPORATED, Dallas, TX (US)

(72) Inventors: Pankaj Gupta, Dausa (IN); Karthik Subburaj, Bangalore (IN); Sujaata Ramalingam, Bangalore (IN); Karthik Ramasubramanian, Bangalore (IN); Indu Prathapan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 387 days.

(21) Appl. No.: 17/351,699

(22) Filed: Jun. 18, 2021

(65) Prior Publication Data

US 2022/0156044 A1 May 19, 2022

(30) Foreign Application Priority Data

Nov. 17, 2020 (IN) .............................. 202041050040

(51) Int. Cl.
*G06F 7/49* (2006.01)
*G06F 7/501* (2006.01)
*G06F 17/14* (2006.01)

(52) U.S. Cl.
CPC ................ *G06F 7/49* (2013.01); *G06F 7/501* (2013.01); *G06F 17/142* (2013.01)

(58) Field of Classification Search
CPC ...... G06F 17/14; G06F 17/141; G06F 17/142; G06F 17/144; G06F 7/49; G06F 7/501
See application file for complete search history.

(56) References Cited

U.S. PATENT DOCUMENTS

2015/0195114 A1* 7/2015 Seki ................... H04L 27/2651
370/210
2017/0220523 A1* 8/2017 Nekuii ................. G06F 17/142
2020/0319296 A1 10/2020 Gupta et al.

OTHER PUBLICATIONS

P. Heckbert, Fourier Transforms and the Fast Fourier Transform (FFT) Algorithm, Notes 3, Computer Graphics 2, 15-463, CMU School of Computer Science, 1998 (Year: 1998).*

(Continued)

*Primary Examiner* — Emily E Larocque
(74) *Attorney, Agent, or Firm* — Michael T. Gabrik; Frank D. Cimino

(57) ABSTRACT

A Radix-3 butterfly circuit includes a first FIFO input configured to couple to a first FIFO. The circuit includes a first adder and first subtractor coupled to the first FIFO input, and a second FIFO input configured to couple to a second FIFO. The circuit includes a second adder and second subtractor coupled to the second FIFO input, and an input terminal coupled to the first adder and first subtractor. The circuit includes a first scaler coupled to the second adder and a first multiplexer, and a second scaler coupled to a third adder and second multiplexer. The circuit includes a third scaler coupled to a third subtractor and third multiplexer. An output of the first multiplexer is coupled to a complex multiplier. An output of the second multiplexer is coupled to a second FIFO output. An output of the third multiplexer is coupled to a first FIFO output.

20 Claims, 9 Drawing Sheets

(56) References Cited

OTHER PUBLICATIONS

D.A. Patterson, et al., Computer Organization and Design: The Hardware/Software Interface, Elsevier Science & Technology, 2007 (Year: 2007).*
M.N. Murty et al., Radix-3 Algorithm for Realization of Discrete Fourier Transform, Int. Journal of Engineering Research and Application, Vo;. 6, Issue 7, (part-5), 2016 (Year: 2016).*
B. Bass, EEC 281—VLSI Digital Signal Processing, Notes on the RRI-FFT, UC Davis, School of Electrical and Computer Engineering, 1998 (Year: 1998).*
S. He, A New Approach to Pipeline FFT Processor, Proceedings of IPPS '96, IEEE, 1996 (Year: 1996).*
C. Yu, Area-Efficient 128- to 2048/1536-Point Pipeline FFT Processor for LTE and Mobile WiMAX Systems, IEEE Transactions on Very Large Scale Integration (VLSI) Systems, vol. 23, No. 9, 2015 (Year: 2015).*
K. Subburaj et al., Single-Chip 77GHz FMCW Automotive Radar with Integrated Front-End and Digital Processing, 23rd International Radar Symposium (IRS), IEEE 2022 (Year: 2022).*

* cited by examiner

MULTI-DIMENSIONAL FFT COMPUTATION PIPELINED HARDWARE ARCHITECTURE USING RADIX-3 AND RADIX-$2^2$ BUTTERFLIES

CROSS-REFERENCE TO RELATED APPLICATIONS

The present application claims priority to Indian Provisional Patent Application No. 202041050040, which was filed Nov. 17, 2020, is titled "Multi-Dimensional FFT Computation Pipelined Hardware Architecture Using Radix 3 And Radix 22 Butted," and is hereby incorporated herein by reference in its entirety.

BACKGROUND

Frequency modulated continuous wave (FMCW) radar systems may transmit a frame containing a series of frequency ramps referred to as chirps. These chirps may be reflected by an object back to the FMCW radar system. After receipt of a signal containing the reflected chirps, the FMCW radar system may down-convert, digitize, and process the received signal to determine characteristics of the object. FMCW radar data processing involves many fast Fourier transforms (FFTs). FFTs are performed to determine the object's range, the object's velocity, and the object's azimuth and elevation angle. Object range and angle determination FFTs are typically one-dimensional (1D) FFTs. The angle dimension FFT is a two-dimensional (2D) FFT.

SUMMARY

In accordance with at least one example of the description, a system includes a Radix-3 butterfly circuit. The Radix-3 butterfly circuit includes a first first-in-first-out (FIFO) input configured to couple to a first FIFO. The Radix-3 butterfly circuit includes a first adder and a first subtractor coupled to the first FIFO input. The Radix-3 butterfly circuit also includes a second FIFO input configured to couple to a second FIFO. The Radix-3 butterfly circuit includes a second adder and a second subtractor coupled to the second FIFO input. The Radix-3 butterfly circuit also includes an input terminal coupled to the first adder and the first subtractor. The Radix-3 butterfly circuit includes a first scaler coupled to the second adder and a first multiplexer. The Radix-3 butterfly circuit also includes a second scaler coupled to a third adder and a second multiplexer. The Radix-3 butterfly circuit includes a third scaler coupled to a third subtractor and a third multiplexer, where an output of the first multiplexer is coupled to a complex multiplier, an output of the second multiplexer is coupled to a second FIFO output that is configured to couple to the second FIFO, and an output of the third multiplexer is coupled to a first FIFO output that is configured to couple to the first FIFO.

In accordance with at least one example of the description, a system includes a multi-dimensional Radix-$2^2$ butterfly architecture. The multi-dimensional Radix-$2^2$ butterfly architecture includes a first butterfly stage and a second butterfly stage. The first butterfly stage includes a first FIFO input configured to couple to a first FIFO. The first butterfly stage also includes a first adder and a first subtractor coupled to the first FIFO input. The first butterfly stage includes an input terminal coupled to the first adder and the first subtractor. The first butterfly stage also includes a first multiplexer coupled to the first adder. The first butterfly stage includes a second multiplexer coupled to the first subtractor, where an output of the first multiplexer is coupled to a third multiplexer, and an output of the second multiplexer is coupled to a first FIFO output that is configured to couple to the first FIFO. The second butterfly stage includes a second FIFO input configured to couple to a second FIFO. The second butterfly stage also includes a second adder and a second subtractor coupled to the second FIFO input. The second butterfly stage includes an input terminal coupled to the second adder and the second subtractor. The second butterfly stage includes a fourth multiplexer coupled to the second adder. The second butterfly stage also includes a fifth multiplexer coupled to the second subtractor, where an output of the fourth multiplexer is coupled to a complex multiplier, and an output of the fifth multiplexer is coupled to a second FIFO output that is configured to couple to the second FIFO.

In accordance with at least one example of the description, a method includes receiving data samples at a Radix-3 butterfly stage. The method also includes performing a 3-point FFT at the Radix-3 butterfly stage. The method includes providing a first output data sample from the Radix-3 butterfly stage to a Radix-$2^2$ butterfly stage. The method also includes performing a 2-point butterfly operation and a twiddle multiplication on the first output data sample at the Radix-$2^2$ butterfly stage. The method includes providing a second output data sample from the Radix-$2^2$ butterfly stage to a memory. The method also includes providing a third output data sample from the Radix-$2^2$ butterfly stage to another Radix-$2^2$ butterfly stage.

DETAILED DESCRIPTION

In some FFT processing systems, computation of a 2D (M×N point) FFT using a 1D hardware pipeline is performed by conducting multiple passes through the hardware, one pass for each dimension. This process increases the time used to perform a 2D FFT compared to processing the two dimensions simultaneously. In some systems that process two dimensions simultaneously, the systems may use a Radix-2 butterfly structure, but do not implement a Radix-$2^2$ or a Radix-3 butterfly structure. These systems also may not efficiently compute FFTs larger than two dimensions, such as three, four, or five dimension FFTs.

In examples herein, a Radix-3 butterfly stage is implemented before a series of Radix-2 or Radix-$2^2$ stages. With a Radix-3 butterfly stage, FFTs other than FFTs sized as powers of 2 may be performed. For example, using only Radix-2 stages, the number of samples processed are limited to powers of 2 (1024, 512, 256, etc.). By including a Radix-3 stage, FFTs of size 128, 192, 256, 384, 512, 768, etc., may be performed. The examples described herein also provide an FFT architecture that is both reconfigurable and area-efficient. FFTs may be performed that are $2^N$ FFTs or $3\times2^{N-1}$ FFTs. In addition, first-in-first-out (FIFO) random access memory (RAM) for the Radix-3 butterfly stage is shared with the top two Radix-2 butterfly stages, which reduces area usage. The FFT engine may compute a $3\times2^N$ point FFT where $1 \leq N \leq 10$, or may compute a $2^N$ point FFT where $1 \leq N \leq 12$.

Figure 1:
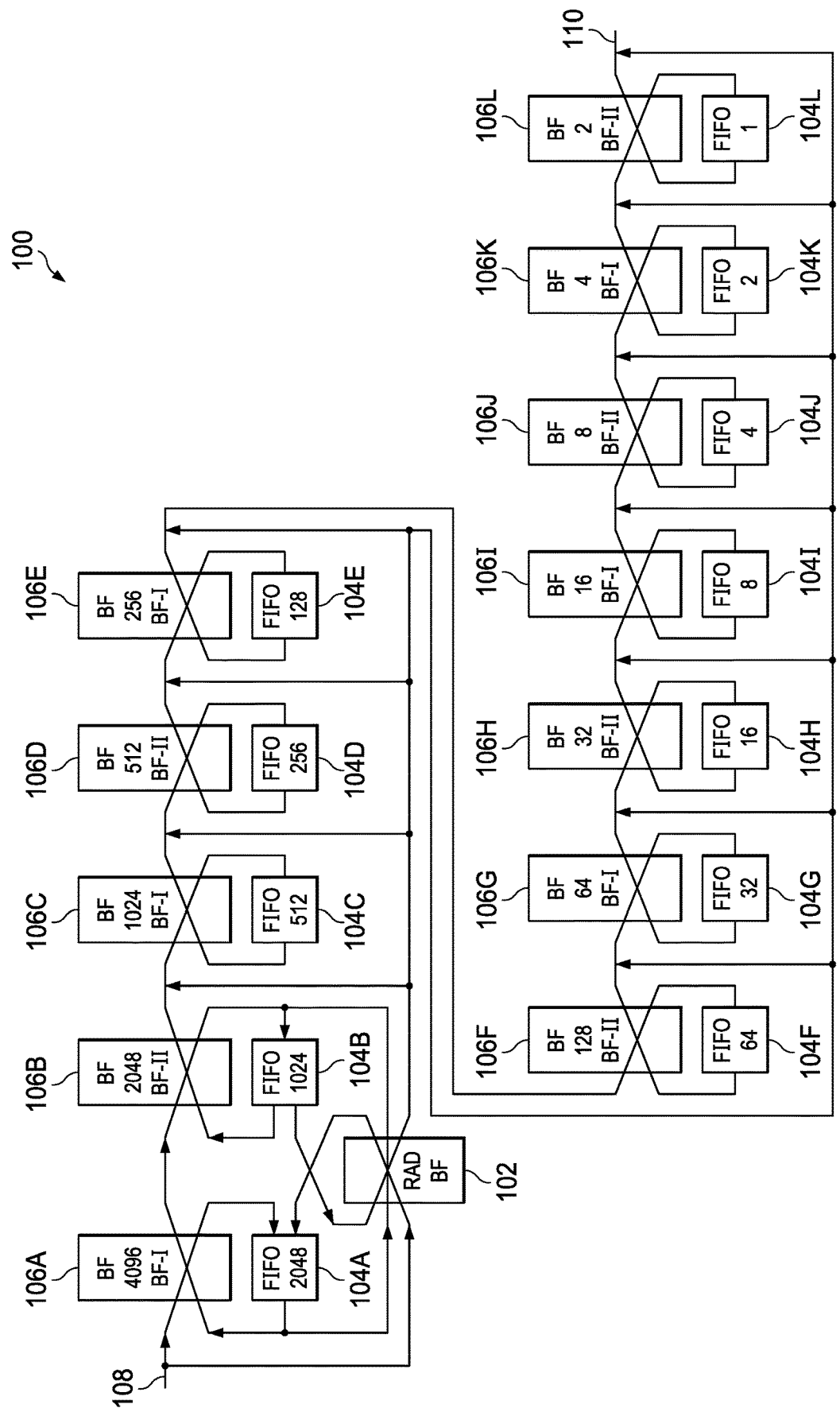
FIG. 1 is a diagram of an FFT architecture in accordance with various examples.

FIG. 1 is a diagram of an example FFT architecture 100 in accordance with various examples herein. FFT architecture 100 includes a Radix-3 butterfly stage 102, FIFOs 104A-104L (collectively, FIFOs 104), Radix-2 butterfly stages 106A-106L (collectively, Radix-2 butterfly stages 106), input terminal 108, and output 110. The details of Radix-3 butterfly stage 102 and Radix-2 butterfly stages 106A-106L are described below. In FFT architecture 100, Radix-3 butterfly stage 102 may be activated or deactivated depending on the type of FFT performed.

In the example FFT architecture 100, each Radix-2 butterfly stage 106 has an associated FIFO 104. For example, Radix-2 butterfly stage 106A has an associated FIFO 104A, Radix-2 butterfly stage 106B has an associated FIFO 104B, and so on. During an example operation, an input data sample enters FFT architecture 100 via input terminal 108 each clock cycle until the input data samples are exhausted. An output data sample is generated at output 110 each clock cycle as the input data samples move through FFT architecture 100. In a Radix-$2^2$ structure, the Radix-2 butterfly stages 106 are arranged in pairs. For example, Radix-2 butterfly stage 106A is a butterfly-I (BF-I) stage, which is the first part of the Radix-$2^2$ stage for an N-point FFT. Radix-2 butterfly stage 106B is a butterfly-II (BF-II) stage, which is the second part of the Radix-$2^2$ stage for an N-point FFT. Likewise, Radix-2 butterfly stage 106C is a BF-I stage, while Radix-2 butterfly stage 106D is a BF-II stage that is associated with Radix-2 butterfly stage 106C. As shown in FFT architecture 100, Radix-2 butterfly stages 106A, 106C, 106E, 106G, 106I, and 106K are BF-I stages, while Radix-2 butterfly stages 106B, 106D, 106F, 106H, 106J, and 106L are BF-II stages. In a Radix-2 architecture, each Radix-2 butterfly stage 106 includes a complex multiplier (described below). However, in a Radix-$2^2$ architecture, there is one complex multiplier for each pair of BF-I and BF-II stages. In this example, the BF-II stages include a complex multiplier, while the BF-I stages do not. Therefore, FFT architecture 100 has area and power savings compared to an alternative architecture that uses a complex multiplier for each Radix-2 butterfly stage.

As described above, Radix-3 butterfly stage 102 is enabled to perform FFTs that have a number of samples that are not a power of 2. In FFT architecture 100, if a $2^N$ FFT is performed, the Radix-3 butterfly stage 102 may be bypassed or disabled, and input data samples are processed through the Radix-2 butterfly stages 106. If a $3\times2^N$ point FFT is performed, Radix-3 butterfly stage 102 is enabled. A $3\times2^N$ point FFT may be, for example, a 3K, 1.5K, 768, 384, 192, etc., point FFT. The highest form of the $3\times2^N$ point FFT is a 3K point FFT in this example. For a 3K point FFT, Radix-2 butterfly stages 106A and 106B are unused. The output of Radix-3 butterfly stage 102 is provided to Radix-2 butterfly stage 106C. Therefore, because Radix-2 butterfly stages 106A and 106B are unused, the corresponding FIFOs (e.g., FIFO 104A and FIFO 104B) for Radix-2 butterfly stages 106A and 106B are repurposed and used by Radix-3 butterfly stage 102. By repurposing FIFOs 104A and 104B instead of providing dedicated FIFOs for Radix-3 butterfly stage 102, area usage and complexity of FFT architecture 100 is reduced.

For FFT operations that use Radix-3 butterfly stage 102, the output of Radix-3 butterfly stage 102 is provided as an input to the appropriate Radix-2 butterfly stage 106. For example, for a $3\times2^{10}$ FFT, the output of Radix-3 butterfly stage 102 is provided to the $2^{10}$ Radix-2 butterfly stage 106 stage, which is Radix-2 butterfly stage 106C. In another example, for a $3\times2^6$ FFT (e.g., a 192 point FFT), the output of Radix-3 butterfly stage 102 is provided to the $2^6$ Radix-2 butterfly stage 106 stage, which is Radix-2 butterfly stage 106G. Therefore, the output of Radix-3 butterfly stage 102 provided to whichever of the Radix-2 butterfly stages 106 is used to perform the appropriate FFT. In this manner, FFT architecture 100 may perform FFTs where the number of samples is a power of 2, and may also perform FFTs other than FFTs with a number of samples that is a power of 2.

In some examples, a Radix-2 butterfly stage 106 may be reconfigured to behave as a Radix-2 butterfly stage rather than a Radix-$2^2$ butterfly stage. As described above, Radix-2 butterfly stages 106 in FFT architecture 100 use a Radix-$2^2$ structure, and the Radix-2 butterfly stages 106 are either BF-I or BF-II stages. If the output of the Radix-3 butterfly stage 102 is provided to a BF-II stage (depending on the size of the FFT performed), that BF-II stage is reconfigured to behave as a Radix-2 butterfly stage instead of a Radix-$2^2$ BF-II stage. The BF-II stages are reconfigured by adjusting the twiddle factors in the BF-II stages. The twiddle factor may be a weighting factor used in FFT calculations in one example, represented by the letter W. The twiddle factor is a trigonometric constant coefficient that is multiplied by the data in the butterfly operations during the FFT calculation. The adjustment of the twiddle factors is described below.

Figure 2:
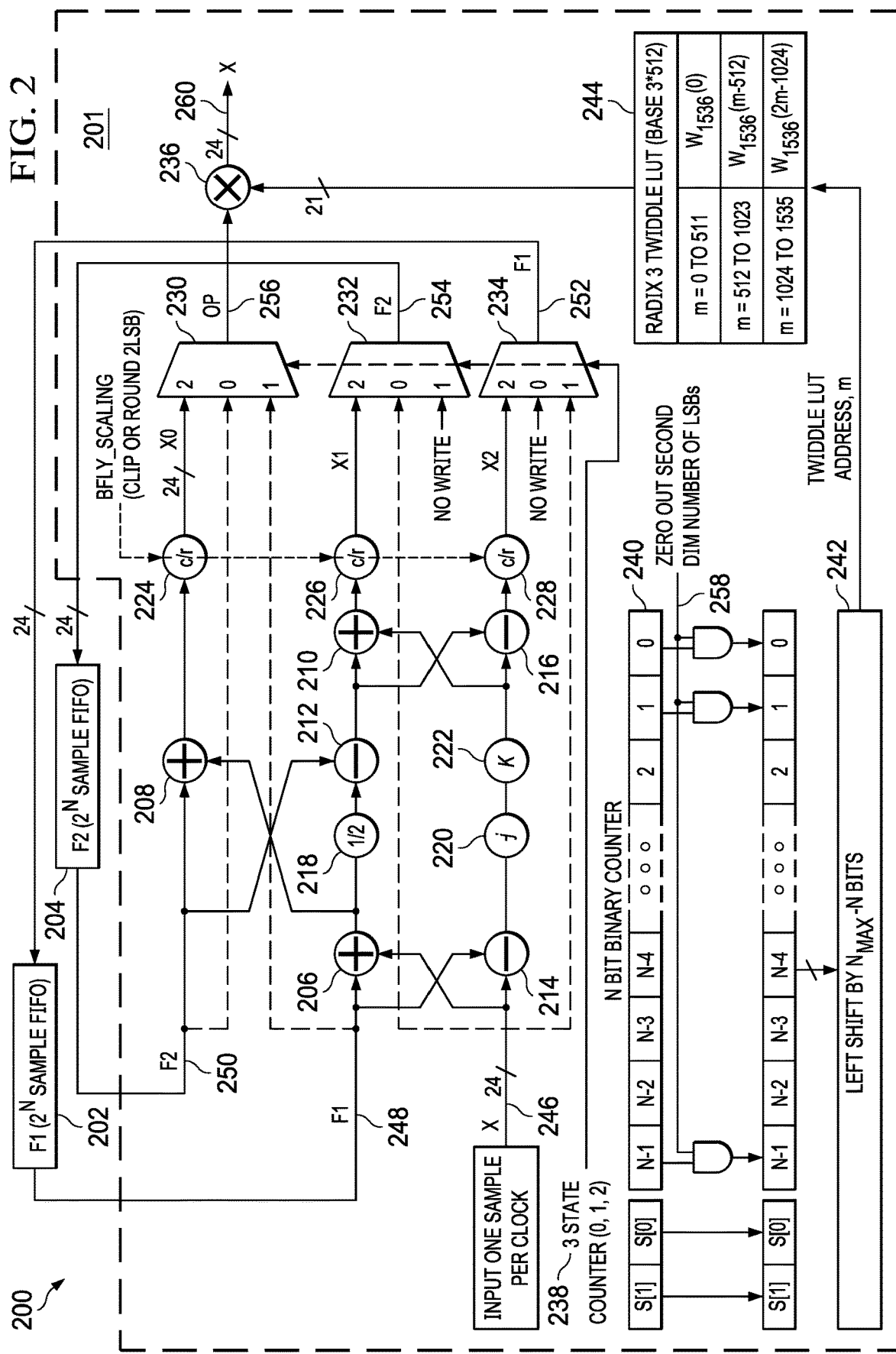
FIG. 2 is a diagram of a Radix-3 butterfly architecture in accordance with various examples.

FIG. 2 is a diagram of a Radix-3 butterfly architecture 200 in accordance with various examples herein. Radix-3 butterfly architecture 200 includes Radix-3 butterfly stage 201 and FIFOs 202 and 204. Radix-3 butterfly stage 201 includes adders 206, 208, and 210, subtractors 212, 214, and 216, multipliers 218, 220, and 222, scalers 224, 226, and 228, multiplexers 230, 232, and 234, and complex multiplier 236. Radix-3 butterfly stage 201 also includes 3-state counter 238, binary counter 240, shifter 242, and lookup table (LUT) 244. Radix-3 butterfly stage 201 also includes input 246, paths 248 and 250, multiplexer outputs 252, 254, and 256, 2D FFT converter 258, and output 260. Radix-3 butterfly stage 201 receives inputs at input 246, path 248, and path 250. Path 248 provides a FIFO 1 202 input to the Radix-3 butterfly stage 201 (e.g., a first FIFO input). Path 250 provides a FIFO 2 204 input to the Radix-3 butterfly stage 201 (e.g., a second FIFO input). Radix-2 butterfly stage produces outputs at multiplexer output 252, multiplexer output 254, and output 260. Multiplexer output 252 (e.g., a first FIFO output) is provided to FIFO 1 202, and multiplexer output 254 (e.g., a second FIFO output) is provided to FIFO 2 204.

FIFOs 202 and 204 may be variable length FIFOs in an example. The FIFOs include memory configured to store input samples and provide samples for the butterfly operations. In one example, FIFOs 202 and 204 are shared with the top two Radix-2 butterfly stages 106A and 106B as described above with respect to FIG. 1. Therefore, FIFOs 202 and 204 are FIFOs 104A and 104B from FIG. 1 in one example. Referring again to FIG. 2, FIFOs 202 and 204 may each hold $2^N$ samples in one example. Samples are provided to FIFO 202 via multiplexer output 252, while samples are provided to FIFO 204 via multiplexer output 254. FIFO 202 provides samples along path 248 for butterfly operations. FIFO 204 provides samples along path 250 for butterfly operations.

In an example, Radix-3 butterfly stage 201 receives three input samples and produces three output samples at a clock cycle. One input sample is received from input 246, which comes from outside of Radix-3 butterfly stage 201. The other two input samples come from FIFO 202 and FIFO 204, also shown as residing outside of Radix-3 butterfly stage 201 in this example. The output samples are produced by multiplexers 230, 232, and 234. Multiplexer output 252 provides an output sample to FIFO 202. Multiplexer output 254 provides an output sample to FIFO 204. Multiplexer output 256 provides an output sample to complex multiplier 236. The output of complex multiplier 236 is output 260, which provides the output sample to the next stage in the pipelined FFT architecture.

In an example operation, an input sample is received at input 246. The input sample is provided to adder 206 and subtractor 214. Adder 206 adds the input sample to a sample from FIFO 202. Subtractor 214 subtracts the input sample and a sample from FIFO 202. The output of subtractor 214 is provided to multipliers 220 and 222. Multiplier 220 multiplies the output of subtractor 214 by the complex multiple −j, and multiplier 222 multiplies the output by a constant k. In one example, k may be $(\sqrt{3})/2$. The output of multiplier 222 is provided to adder 210 and subtractor 216.

The output of adder 206 is provided to adder 208 and multiplier 218. Multiplier 218 multiplies the sample by ½ in one example. The output of multiplier 218 is provided to subtractor 212. The output of subtractor 212 is provided to adder 210 and subtractor 216. The output of subtractor 216 is provided to scaler 228. The output of adder 210 is provided to scaler 226. Scalers 224, 226, and 228 may clip or round the two least significant bits of the sample. The output of scaler 228 is provided to multiplexer 234 and is labeled X2 in FIG. 2. The output of scaler 226 is provided to multiplexer 232 and is labeled X1 in FIG. 2. Multiplexer output 252 is provided to FIFO 202, while multiplexer output 254 is provided to FIFO 204.

Adder 208 receives the output of adder 206 and a sample from FIFO 204. The output sample from adder 208 is provided to scaler 224. The output of scaler 224 is provided to multiplexer 230 and is labeled X0 in FIG. 2. Multiplexer output 256 is provided to complex multiplier 236, which produces output 260. Output 260 provides the output sample to the next stage in the pipelined FFT architecture.

The 3-state counter 238 is a counter that has three states: 00, 01, and 10. The state of 3-state counter 238 is provided to multiplexers 230, 232, and 234. 3-state counter 238 provides instructions to multiplexers 230, 232, and 234 based on the state of the counter. If 3-state counter 238 is at state 00, the previous FFT's X1 value is provided from the FIFO. If 3-state counter 238 is at state 01, the previous FFT's X2 value is provided from the FIFO. If 3-state counter 238 is at state 10, then X0, X1, and X2 are computed. Also, the current FFT's X0 value from Radix-3 butterfly stage 201 is provided, and the X1 and X2 values are stored in FIFOs 202 and 204.

Radix-3 butterfly stage 201 also includes binary counter 240. Binary counter 240 is an N-bit counter. The output of binary counter 240 is provided to shifter 242. Shifter 242 left-shifts a twiddle lookup table address by $N_{MAX}$-N bits, and provides a value m at its output. In one example, a twiddle factor is a coefficient that is multiplied by the data during an FFT operation. Twiddle lookup tables and their uses are described below. Lookup table 244 is a Radix-3 twiddle lookup table. Lookup table 244 receives the value of m from shifter 242. Based on the value of m, a weighting factor W is retrieved from lookup table 244. The weighting factor W is provided to complex multiplier 236, where W is multiplied by multiplexer output 256.

Radix-3 butterfly stage 201 also includes 2D FFT converter 258. Radix-3 butterfly stage 201 may be used to perform a 2D FFT in some examples. To perform a 2D FFT, a number of least significant bits (LSB) of N-bit binary counter 240 are zeroed out. In an example, the number of LSBs that are zeroed out is the size of the second dimension of the FFT. For an M×N 2D FFT, N LSBs would be zeroed out. In a 2D FFT of size 48×32, 32 LSBs would be zeroed out, for example. By zeroing out the LSBs of N-bit binary counter 240, a different twiddle LUT address is selected by shifter 242. The FFT results may be provided at the output 260 in a partly bit-reversed order. Adjusting for the FFT output order is described below.

Figure 3:
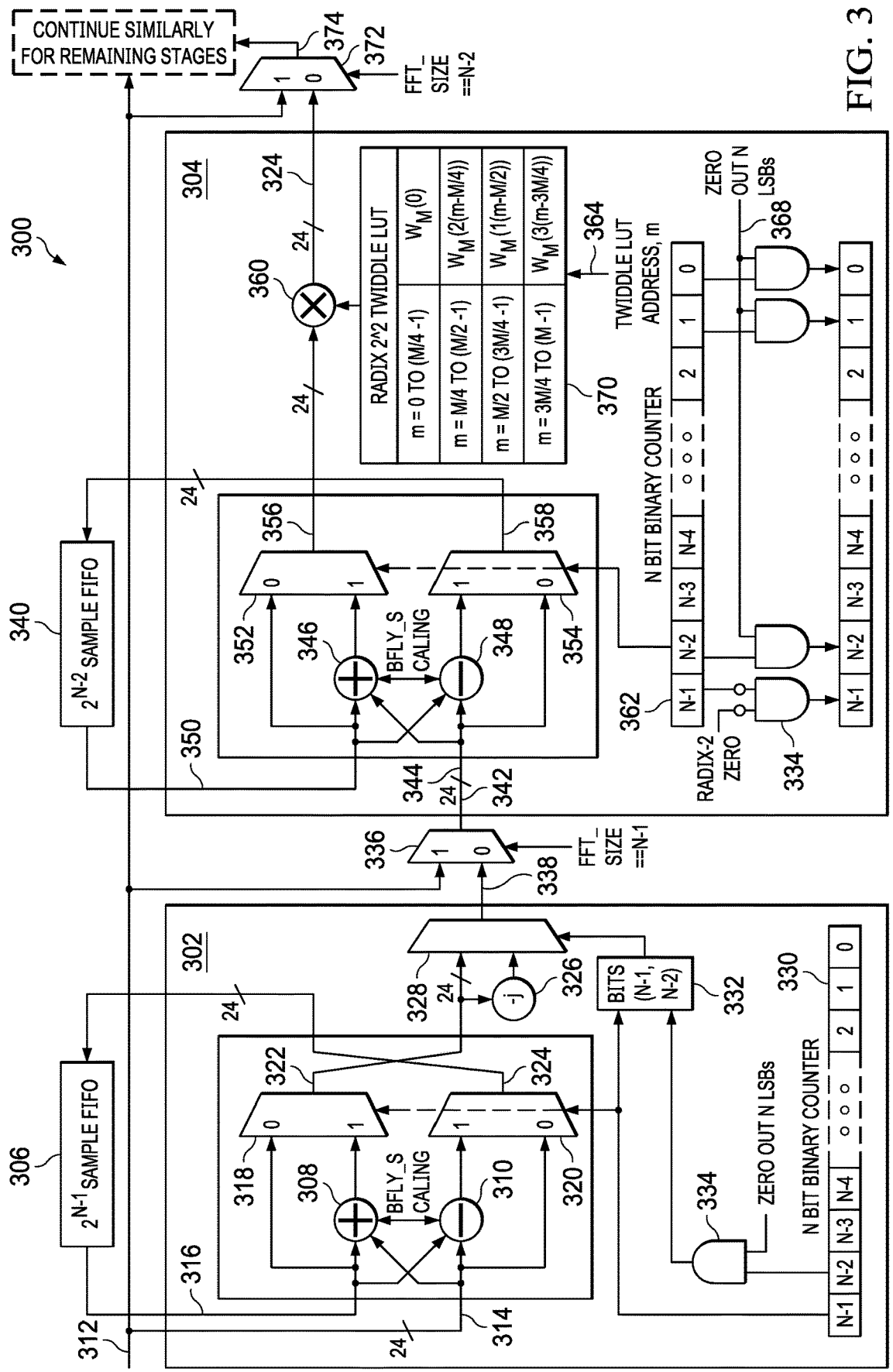
FIG. 3 is a diagram of a Radix-$2^2$ butterfly architecture in accordance with various examples.

FIG. 3 is a diagram of a Radix-$2^2$ butterfly architecture 300 in accordance with various examples herein. Radix-$2^2$ butterfly architecture 300 may be reconfigured for 2D FFTs in some examples. Radix-$2^2$ butterfly architecture 300 may be reconfigured for FFTs greater than 2D FFTs in some examples. Radix-$2^2$ butterfly architecture 300 may also be combined with Radix-3 butterfly architecture 200 as described above with respect to FIG. 1 to realize $3.2^M \times 2^N$ point FFTs in some examples.

Radix-$2^2$ butterfly architecture 300 includes BF-I stage 302, BF-II stage 304, FIFO 306, and FIFO 340. BF-I stage 302 may be similar to Radix-2 butterfly stages 106A, 106C, 106E, 106G, 106I, and 106K in FIG. 1, while BF-II stage 304 may be similar to Radix-2 butterfly stages 106B, 106D, 106F, 106H, 106J, and 106L in FIG. 1, in some examples. FIFOs 306 and 340 are the FIFOs 104 (e.g., FIFOs 104A-104L) associated with the various butterfly stages 106 (e.g., butterfly stages 106A-106L) in FIG. 1. Referring again to FIG. 3, BF-I stage 302 is the first part of a Radix-$2^2$ stage for an N point FFT. BF-I stage 302 includes adder 308, subtractor 310, input 312, paths 314 and 316, multiplexers 318 and 320, multiplexer outputs 322 and 324, multiplier 326, multiplexer 328, N-bit binary counter 330, bits 332, and 2D FFT converter 334. Multiplexer 336 resides between BF-I stage 302 and BF-II stage 304, and receives output 338 of multiplexer 328 as well as a sample from input 312.

BF-II stage 304 includes input 342, path 344, adder 346, subtractor 348, path 350, multiplexers 352 and 354, multiplexer outputs 356 and 358, complex multiplier 360, N-bit binary counter 362, N-bit binary counter output 364, Radix-2 converter 366, 2D FFT converter 368, lookup table 370, multiplexer 372, and multiplexer output 374.

As described above, in a Radix-$2^2$ architecture, there is one complex multiplier for each pair of BF-I and BF-II stages. In this example, BF-II stage 304 includes a complex multiplier 360, while BF-I stage 302 does not. In operation, BF-I stage 302 receives an input sample at input 312 at each clock cycle, which may come from a previous butterfly stage in some examples. BF-I stage 302 provides an output sample at output 338 to BF-II stage 304 at each clock cycle. BF-II stage receives an input sample at input 342 and produces an output sample at multiplexer output 374 at each clock cycle. The output sample is provided to the next stage of an FFT architecture, if the next stage is present. If the BF-II stage 304 is the final stage, the output sample is the final output of the FFT architecture, as shown in FIG. 1.

Referring again to FIG. 3, in operation, an input sample from input 312 is provided along path 314 and is then provided to adder 308 and subtractor 310. Adder 308 adds the input sample to a sample from FIFO 306, which is provided to adder 308 via path 316. FIFO 306 includes $2^{N-1}$ samples in this example (for an N-point FFT). The output of adder 308 is provided to multiplexer 318. Subtractor 310 receives the input sample from path 314 and the sample from FIFO 306. The output of subtractor 310 is provided to multiplexer 320. Multiplexer output 322 provides an output sample to multiplexer 328 and to multiplier 326. Multiplexer output 324 provides its output sample to FIFO 306.

Multiplexer 328 provides an output result at output 338. Bits 332 provide an instruction for the action performed by the BF-I stage 302. Two bits (N−1 and N−2) are read from N-bit binary counter 330. The bits N−1 and N−2 from N-bit binary counter may have one of four values: 00, 01, 10, and 11. For 00, the previous FFT's (a−b) component is provided from FIFO 306. For 01, the previous FFT's (a−b) component is provided from FIFO 306, and the component undergoes a −j rotation. For 10, the current FFT's (a+b) component is provided by the BF-I stage. For 11, current FFT's (a+b) component is also provided by the BF-I stage.

2D FFT converter 334 is useful for converting Radix-$2^2$ butterfly architecture 300 to perform 2D FFTs. 2D FFT converter 334 zeros out N LSBs of the output of N-bit binary counter 330 for an M×N 2D FFT. In one example, an AND gate is used for 2D FFT converter 334, but any other suitable logic or circuitry may be used as well.

The BF-II stage 304 operates similarly to BF-I stage 302, with some differences as described herein. As one example, BF-II stage 304 includes a complex multiplier 360. In operation, BF-II stage 304 receives an input sample at input 342 from multiplexer 336. The input sample travels on path 344 to subtractor 348. The input sample is also provided to adder 346.

Adder 346 adds the input sample to a sample from FIFO 340, which is provided to adder 346 via path 350. FIFO 340 includes $2^{N-2}$ samples in this example (for an N-point FFT). The output of adder 346 is provided to multiplexer 352. Subtractor 348 receives the input sample from path 344 and the sample from FIFO 340. The output of subtractor 348 is provided to multiplexer 354. The output of multiplexer 356 is provided to complex multiplier 360. The output of multiplexer 358 is provided to FIFO 340.

Complex multiplier 360 provides an output sample to multiplexer 372. Multiplexer 372 also receives, at an input, a sample from input 312. Multiplexer 372 produces an output sample at multiplexer output 374, and this output sample is provided to a next stage of the FFT architecture, if the FFT architecture has any additional stages.

Radix-$2^2$ butterfly architecture 300 includes N-bit binary counter 362. The N−2 bit of N-bit binary counter 362 provides an instruction to BF-II stage 304. If the bit is 0, the action performed is to provide a previous FFT's (a+b) from FIFO 340. If the bit is 1, the action performed is to provide the current FFT's (a+b) from the Radix-$2^2$ butterfly architecture 300.

Radix-$2^2$ butterfly architecture 300 also includes Radix-2 converter 366. Radix-2 converter 366 could be an AND gate in one example. To perform a Radix-2 operation using Radix-$2^2$ butterfly architecture 300, Radix-2 converter 366 zeros out the N−1 bit from N-bit binary counter 362. Zeroing out the N−1 bit restricts the twiddle LUT access, as described below, to enable Radix-2 operations. The twiddle LUT address is provided to lookup table 370 via N-bit binary counter output 364. A value from lookup table 370 is provided to complex multiplier 360. The address of the value in lookup table 370 is denoted as m. In this example, m=(counter-latency)% M. Counter is the counter value from N-bit binary counter 362. M is equal to $2^N$, and the latency equals M/2. m is determined by the counter value minus the latency, modulo M, as shown in the equation above. m is used in lookup table 370 to find the WM weighting factor, which is provided to complex multiplier 360.

Radix-$2^2$ butterfly architecture 300 also includes 2D FFT converter 368. 2D FFT converter 368 is useful for converting Radix-$2^2$ butterfly architecture 300 to perform 2D FFTs. 2D FFT converter 368 zeros out N LSBs of the output of N-bit binary counter 362 for an M×N 2D FFT. In one example, AND gates are used for 2D FFT converter 368, but any other suitable logic or circuitry may be used as well. After the N LSBs are zeroed out, the twiddle LUT address is found and used as described above.

Figure 4:
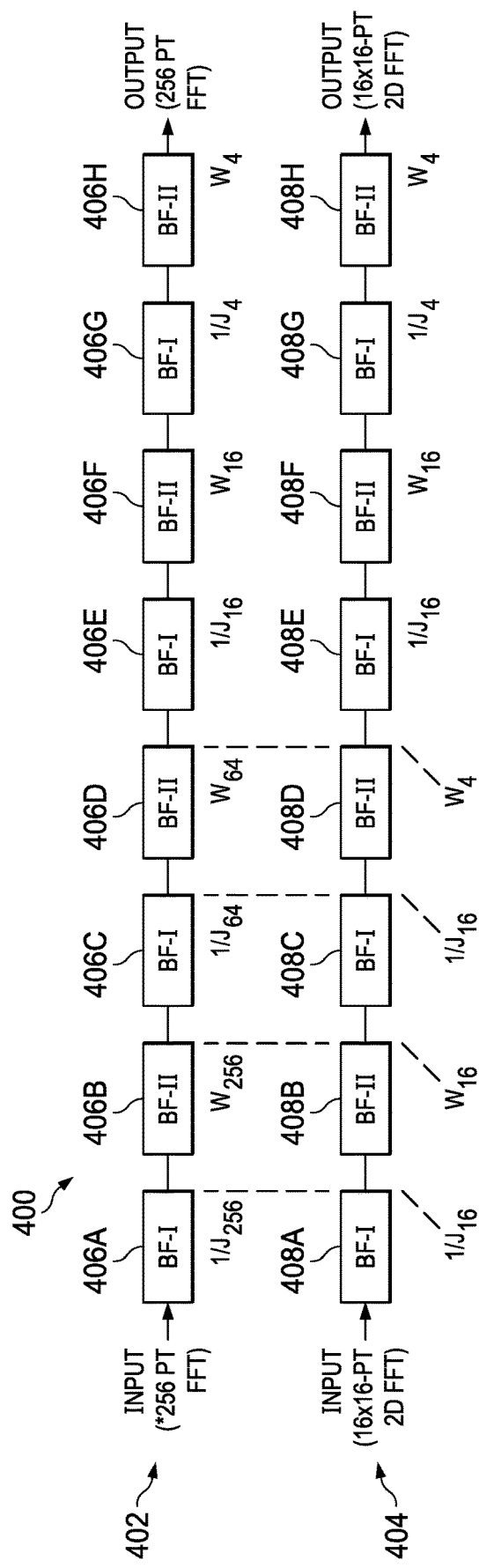
FIG. 4 is a conceptual diagram of a multi-dimensional FFT architecture in accordance with various examples.

FIG. 4 is a conceptual diagram 400 of a multi-dimensional FFT architecture in accordance with various examples herein. The top of diagram 400 shows a 1D FFT architecture 402 using a Radix-$2^2$ butterfly architecture. The bottom of diagram 400 shows a 2D FFT architecture 404 utilizing a modified 1D Radix-$2^2$ butterfly architecture. 1D FFT architecture 402 includes butterfly stages 406A-406H, while 2D FFT architecture 404 includes butterfly stages 408A-408H.

In 1D FFT architecture 402, butterfly stages are arranged in a Radix-$2^2$ butterfly architecture. The butterfly stages 406A-406H are arranged in alternating BF-I and BF-II stages. Butterfly stages 406A, 406C, 406E, and 406G are BF-I stages, while butterfly stages 406B, 406D, 406F, and 406H are BF-II stages. BF-II stages 406B, 406D, 406F, and 406H each include a complex multiplier. The structure of the 1D FFT architecture 402 is similar to the structure discussed above with respect to FIG. 1.

Butterfly stages 406A, 406C, 406E, and 406G are BF-I stages, and use 1 or j multipliers to realize 0 or 90 degree rotations during FFT operation, such as multiplier 326 shown in FIG. 3. Butterfly stages 406B, 406D, 406F, and 406H are BF-II stages, and use the complex multipliers (like complex multiplier 360 in FIG. 3) for non-trivial phase rotations (e.g., rotations other than 0°, 90°, 180°, or 270°), using the weighting factor W. These different types of stages may be reconfigured for 2D FFT operations.

For small M×N values of 2D FFT operations, not all of the Radix-$2^2$ butterflies & twiddle multipliers available for a 1D FFT architecture are used. For example, in an architecture that supports up to 2048=$2^{11}$ point FFT, if a 16×16-pt 2D FFT is performed, during any 16-pt FFT's execution, only the lower four Radix-$2^2$ stages are utilized. 2D FFT architecture 404 shows the architecture for a 2D FFT. Four upper butterfly stages (408A, 408B, 408C, and 408D) perform the upper dimension FFT, while four lower butterfly stages (408E, 408F, 408G, and 408H) perform the lower dimension FFT simultaneously. The twiddle LUT values (1/J or W) are adjusted so that the proper values are selected from the lookup tables for the 2D FFT. These adjustments are described above with the components in FIGS. 2 and 3 that zero out various values in the binary counters for 2D FFT operations. Zeroing out these values in the binary counters ensure that the proper values from the lookup tables are selected to perform 2D FFTs. As an example, for a 1D 256 point FFT, butterfly stage 406B (BF-II) uses a $W_{256}$ value from the lookup table. If this BF-II stage is used in a 2D 16×16 point FFT (butterfly stage 408B), a $W_{16}$ value is retrieved from the lookup table. By adjusting the values selected from the lookup tables and reconfiguring the butterfly stages as shown in FIG. 4, the Radix-$2^2$ butterfly architecture may also be used to perform 2D FFTs.

Figure 5:
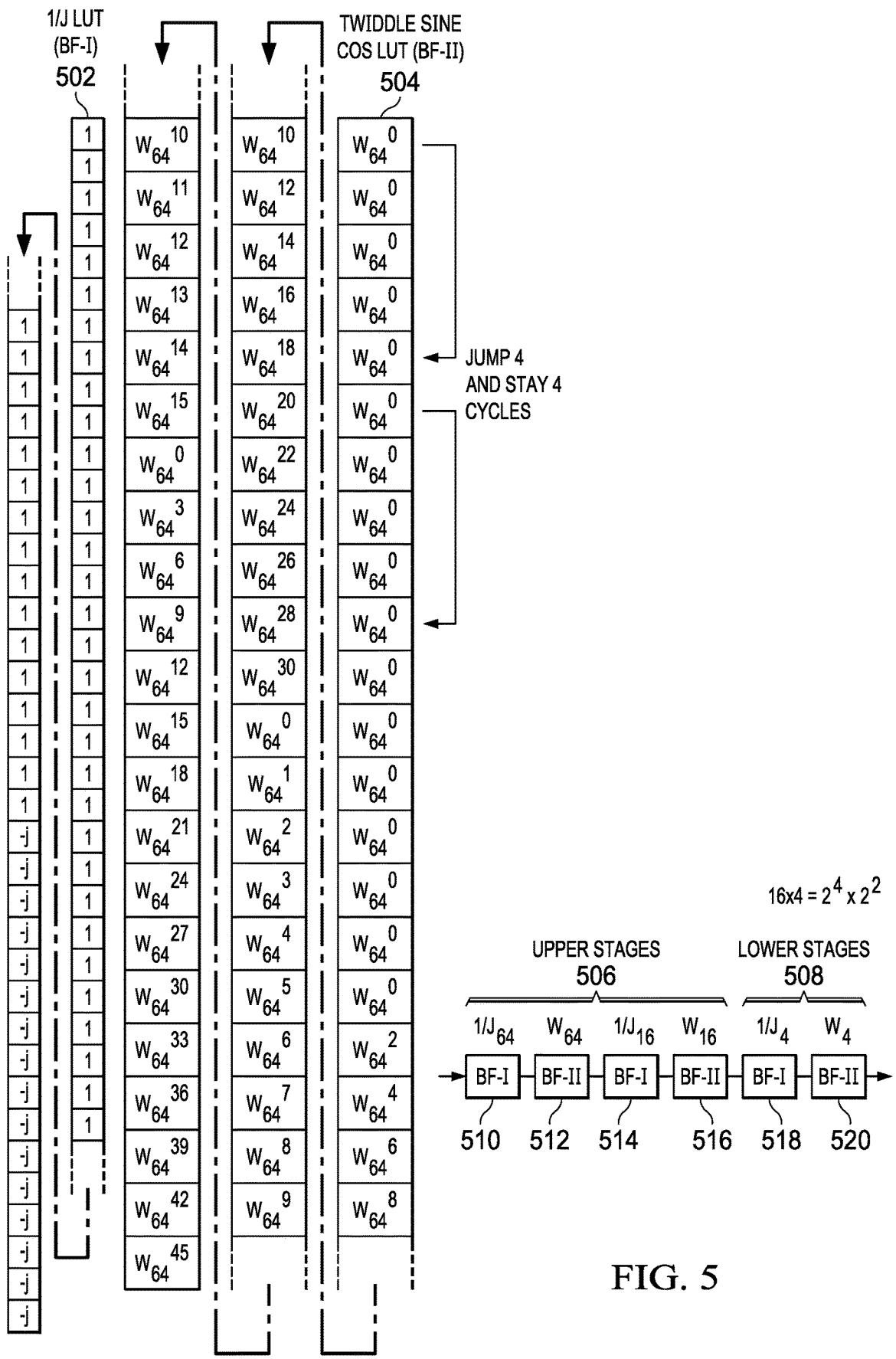
FIG. 5 is a diagram of twiddle lookup tables in accordance with various examples.

FIG. 5 is a diagram of example twiddle lookup tables (LUTs) in accordance with various examples herein. LUT 502 is a 1/J LUT for a BF-I stage, while LUT 504 is a twiddle sine-cosine LUT for a BF-II stage. The twiddle LUTs 502, 504 are used by the FFT butterfly stages to hold values that are retrieved and multiplied by the data samples during the FFT operations. One value from either the LUT 502 or the LUT 504 is retrieved at each clock cycle. The values are retrieved according to the twiddle LUT address from the N-bit binary counter within a butterfly stage. As the N-bit binary counter increments each clock cycle, the next LUT entry is retrieved from the appropriate LUT.

Each FFT stage has a twiddle LUT built for the assigned base of the stage, N. As an example, $W^N = e^{(j2\pi k)/N}$, for N=2, 4, 8, 16, ... 2048. When higher FFT stages are repurposed for the upper stages of a 2D FFT (as described above with respect to FIG. 4), the base of the higher stage should be reduced to behave as if it were a lower stage. As an example, the BF-II stage 406B uses a $W_{256}$ value from the lookup table for a 1D 256 point FFT, but for a 2D 16×16 point FFT a $W_{16}$ value is retrieved for BF-II stage 408B from the lookup table instead. In that example, the base is reduced from 256 to 16. Reducing the base allows the higher butterfly stage to operate as a lower butterfly stage. FIG. 5 provides an example for retrieving the correct value from the lookup tables for a 2D FFT.

FIG. 5 shows a 1/J LUT 502 for a BF-I stage. In this example, the values near the top of LUT 502 are 1, while some values near the bottom of LUT 502 are –J. FIG. 5 also includes twiddle sine-cosine LUT 504 for a BF-II stage. In this example, a first section of values near the top of twiddle sine-cosine LUT 504 are 0, followed by ($W_{64}^0$, $W_{64}^2$, $W_{64}^4$, $W_{64}^6$ ... ), followed by ($W_{64}^0$, $W_{64}^1$, $W_{64}^2$, $W_{64}^3$ ... ), etc. In other examples, LUT 502 and twiddle sine-cosine LUT 504 may have different value than those shown here.

FIG. 5 also includes an example of stages of a 16×4 2D FFT. The 16×4 2D FFT uses four upper stages 506 and two lower stages 508 to perform the 2D FFT. Upper stages 506 include stages 510, 512, 514, and 516. Lower stages 508 include stages 518 and 520. If an upper stage is converted to a lower stage, the twiddle addresses retrieved from the lookup tables are converted as well. As an example, if a 64 stage is converted to a 16 stage, the values retrieved from the lookup tables are selected in steps of 4 (64/16). Instead of selecting each value from the lookup table in order, every fourth value is retrieved instead. The counter that selects and retrieves values from the lookup tables increments in steps of four instead of steps of one. Also, the counter stops for four cycles at each selection until it increments by four to select the next four values.

The architectures described herein may achieve the reduction in the twiddle base for the upper dimension by suppressing the LSBs of the address generation counter in the upper FFT stages. As one example, in FIG. 2 the 2D FFT converter 258 zeros out the LSBs of the N-bit binary counter 240, so that the architecture in FIG. 2 may be used for 2D FFTs. In another example, the BF-I stage 302 in FIG. 3 includes a 2D FFT converter 334 that zeros out N LSBs of N-bit binary counter 330. In another example, the BF-II stage 304 in FIG. 3 includes a 2D FFT converter 368 that zeros out N LSBs of N-bit binary counter 362.

In other examples, the FFTs architectures herein may be extended from 2D FFTs to FFTs greater than 2D, using the modifications described above with some additional clarifications. For each BF-II stage, N LSBs of the twiddle address (from the N-bit binary counters) are suppressed, where N is the sum of all lower dimension log 2 sizes. Also, for each M to N stage transition, butterfly stages are reconfigured to Radix-2 beginning with a BF-II stage. This type of reconfiguring is described below.

Figure 6:
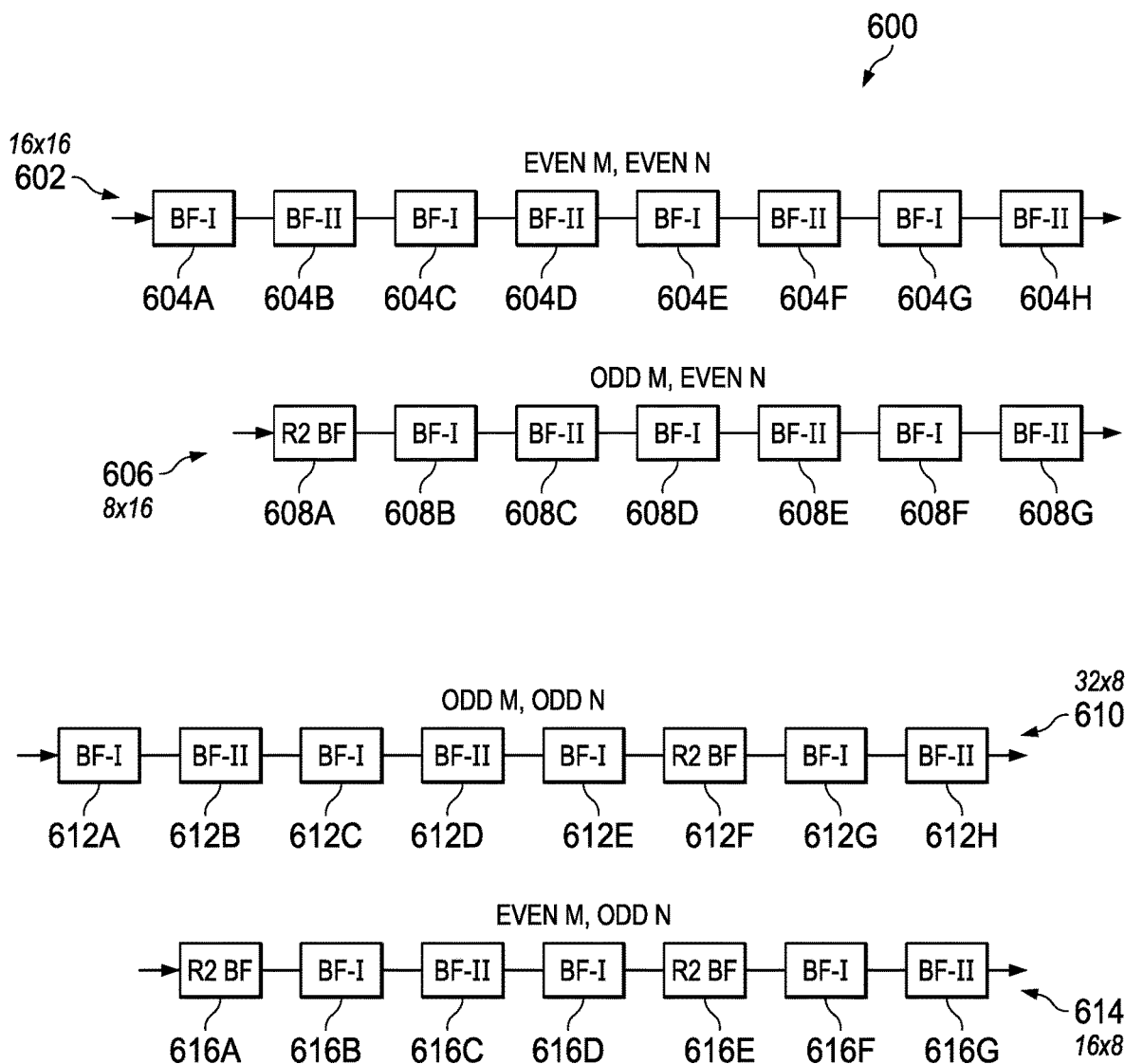
FIG. 6 is a diagram of butterfly stage reconfigurations for 2D FFTs in accordance with various examples.

FIG. 6 is a diagram of butterfly stage reconfigurations 600 for 2D FFTs in accordance with various examples herein. Example 602 includes stages 604A to 604H. Example 606 includes stages 608A to 608G. Example 610 includes stages 612A to 612H. Example 614 includes stages 616A to 616G.

Radix-$2^2$ FFT butterfly stages use pairs of butterflies, as described above. The BF-II stages have complex twiddle multipliers, while the BF-I stages use 0/90/180/270 degree rotations. This architecture saves area versus Radix-2 butterfly architectures, which have complex twiddle multipliers for each stage. However, for an M×N 2D FFT, if either of M or N is odd, then the BF-I to BF-II transitions have to be handled specially. In an example, some Radix-$2^2$ BF-II stages at the M-N transitions are reconfigured as Radix-2 butterfly stages.

Example 602 is a 16×16 (e.g., $2^4 \times 2^4$) 2D FFT. Therefore, M and N are each 4. Because M and N are even, no reconfiguration of BF-II stages is used. Stages 604A to 604D perform the upper dimension FFT, while stages 604E to 604H perform the lower dimension FFT.

Example 606 is an 8×16 (e.g., $2^3 \times 2^4$) 2D FFT. In this example, M is 3 and N is 4. Because M is odd, reconfiguration is useful. Stages 608A to 608C perform the upper dimension FFT, while stages 608D to 608G perform the lower dimension FFT. In this example, the first stage 608A, as one of the stages for the odd dimension (M), is reconfigured from a BF-II Radix-$2^2$ stage to a Radix-2 butterfly stage. The reconfiguration is accomplished with a twiddle sequence change to zero out the N–1 bit of the N-bit binary counter. For example, in FIG. 3, Radix-2 converter 366 zeroes out the N–1 bit of N-bit binary counter 362. The use of Radix-2 converter 366 converts BF-II stage 304 to a Radix-2 butterfly stage, and the $2^3 \times 2^4$ 2D FFT may be performed using the architectures described herein.

Referring again to FIG. 6, example 610 is a 32×8 (e.g., $2^5 \times 2^3$) 2D FFT. In this example, M is 5 and N is 3. Because M and N are both odd, reconfiguration is useful. Stages 612A to 612E perform the upper dimension FFT, while stages 612F to 612H perform the lower dimension FFT. If N is odd, the first stage in the lower (N) dimension is converted to a Radix-2 butterfly stage, using a twiddle sequence change as described above. In example 610, stage 612F is reconfigured to a Radix-2 butterfly stage.

Example 614 is a 16×8 (e.g., $2^4 \times 2^3$) 2D FFT. In this example, M is 4 and N is 3. Because N is odd, reconfiguration is useful. Stages 616A to 616D perform the upper dimension FFT, while stages 616E to 616G perform the lower dimension FFT. Because N is odd, the first stage in the lower (N) dimension is converted to a Radix-2 butterfly stage, using a twiddle sequence change as described above. In example 614, stage 616E is reconfigured to a Radix-2 butterfly stage. Also, because M+N is odd, if the higher dimension (M) begins with a BF-II stage, the BF-II stage is reconfigured to Radix-2. In this example, stage 616A is a BF-II stage, so it is reconfigured to a Radix-2 butterfly stage as well.

With the examples described in FIG. 6, any even/odd M and N combination FFT may be performed using the Radix-$2^2$ architectures described herein. The area savings of the Radix-$2^2$ butter architecture are realized along with the ability to handle 2D FFT combinations. Also, as described above, the Radix-3 butterfly architecture 200 may be reconfigured to realize $3.2^M \times 2^N$ point 2D FFTs as well. The 2D FFT converter 258 zeros out the LSBs of the N-bit binary counter 240, so that the architecture in FIG. 2 may be used for 2D FFTs.

Figure 7:
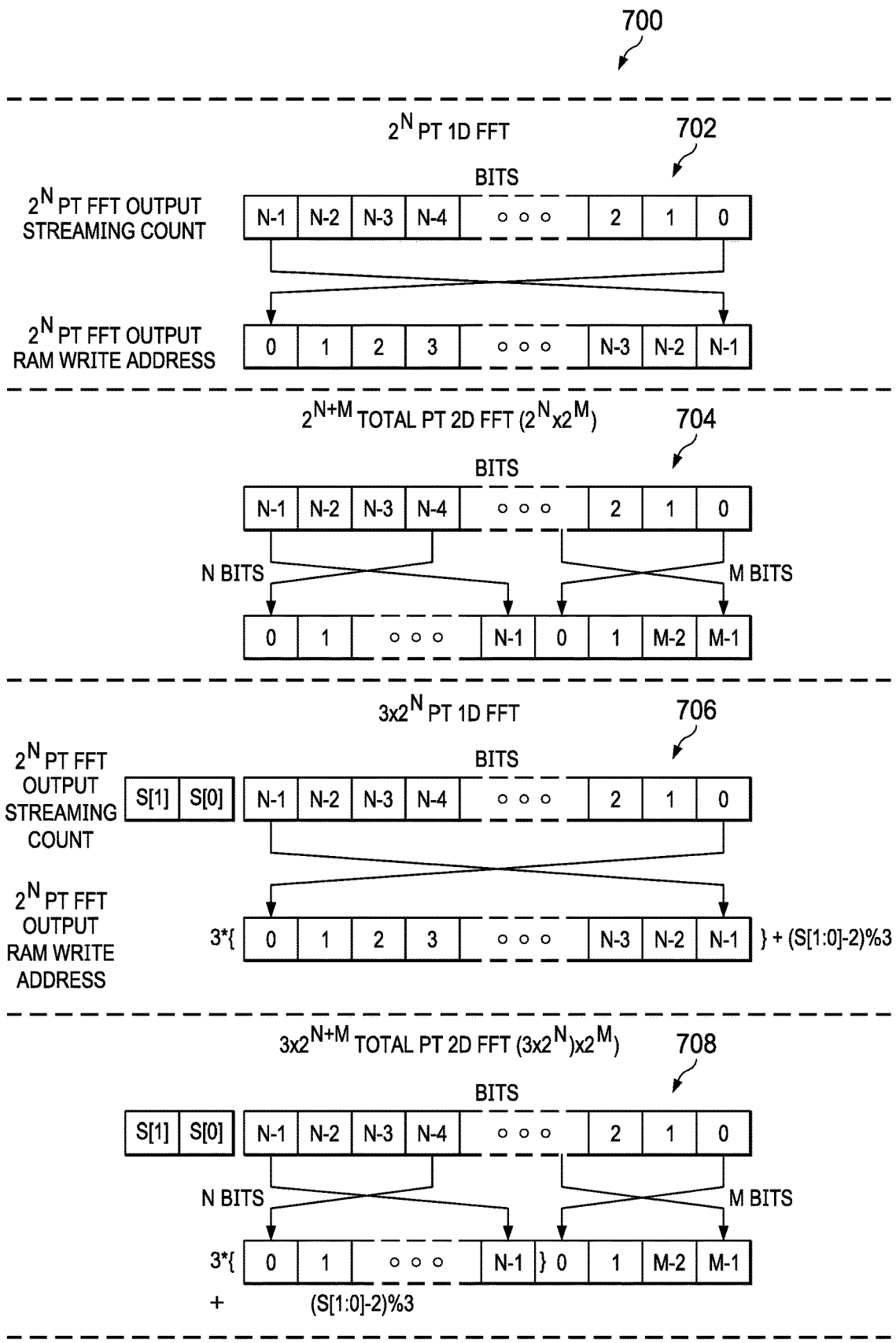
FIG. 7 is a diagram of bit reconfigurations for correcting FFT output order in accordance with various examples.

FIG. 7 is a diagram 700 of bit reconfigurations for correcting FFT output order in accordance with various examples herein. Reconfigurations 702, 704, 706, and 708 represent sequences of output bits for different types of FFTs. The FFT output random access memory (RAM) write address corresponding to each FFT output that is provided by the FFT architecture may be derived as shown in the reconfigurations 702, 704, 706, and 708.

Reconfiguration 702 is performed for a $2^N$ point 1D FFT. The bits are provided by the FFT architecture in a bit-reversed order. Therefore, the bits are reversed as shown in reconfiguration 702 to place the bits in a preferred order.

Reconfiguration 704 is performed for a $2^{M+N}$ total point 2D FFT ($2^N \times 2^M$). In examples herein, the output of the FFT provides the bits in bit-reversed order in each of the two dimensions. As shown in reconfiguration 704, the N bits are output first in bit-reversed order, and then the M bits are output in bit-reversed order. Therefore, the N bits are reversed to find the RAM write address, followed by reversing the M bits and placing those after the N bits.

Reconfiguration 706 is performed for a $3 \times 2^N$ point 1D FFT. In this example, the bits are reversed, but a multiplication and a modulo operation are performed due to the two bits for the 3-state counter 238 (as shown in FIG. 2). The formula is shown in FIG. 7. The formula includes a multiplication by 3, followed by an addition of (S[1:0]-2)%3.

Reconfiguration 708 is performed for a $3 \times 2^{N+M}$ point 2D FFT (($3 \times 2^N) \times (2^M)$). Reconfiguration 708 is a combination of reconfigurations 704 and 706. The bits are in bit-reversed order in each of the two dimensions, because this is a 2D FFT. In addition, a multiplication and a modulo operation are performed on the N-direction bits due to the two bits for the 3-state counter 238 (as shown in FIG. 2). The formula is shown in FIG. 7. The formula includes a multiplication by 3 for the N-direction bits, followed by an addition of (S[1:0]-2)%3.

Figure 8:
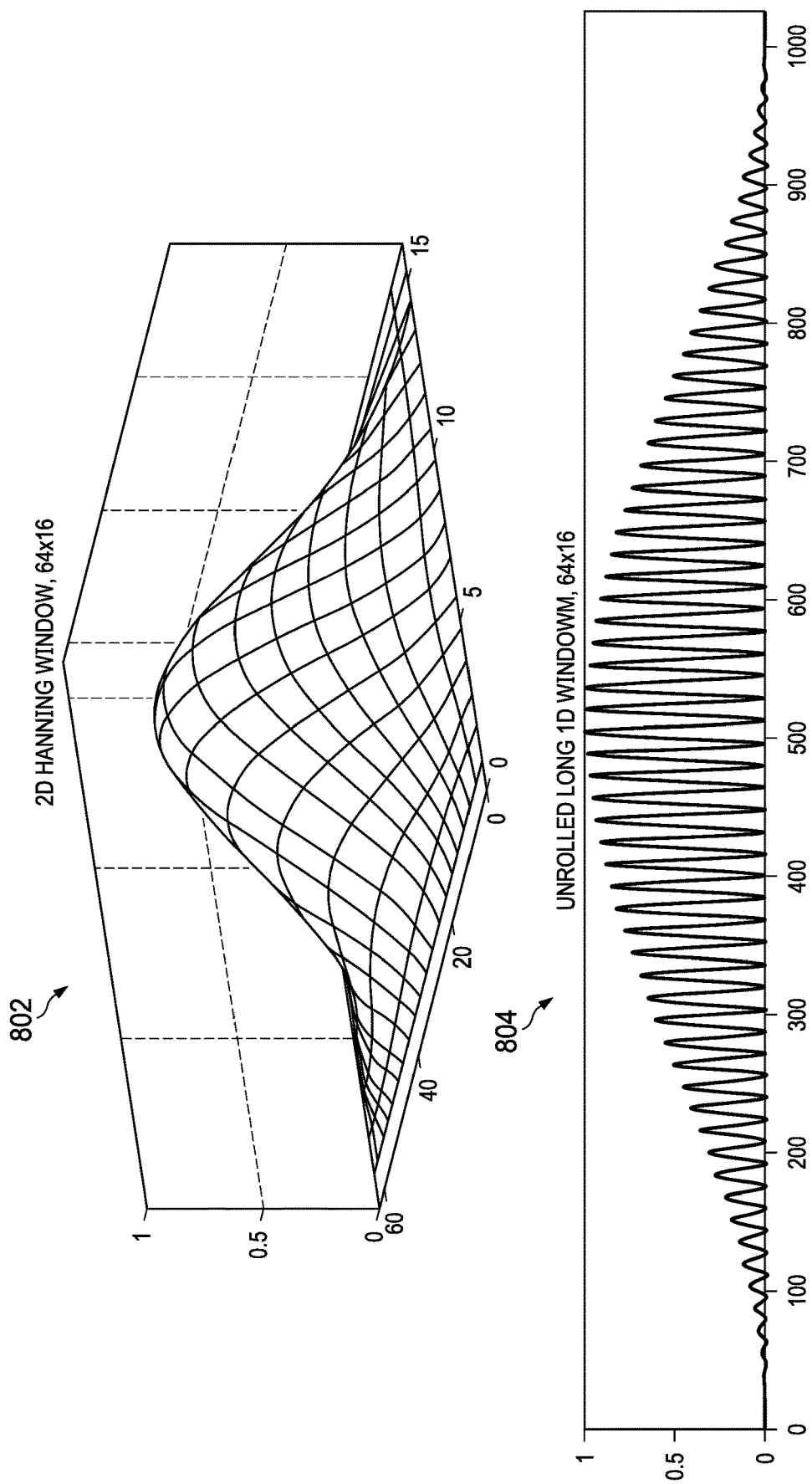
FIG. 8 is a pair of graphs that depict an example of windowing in multi-dimensional FFTs in accordance with various examples.

FIG. 8 is a pair of graphs that depict an example of windowing in multi-dimensional FFTs in accordance with various examples. Windowing reduces the effects of performing an FFT over a non-integer number of cycles. Windowing includes multiplying the time record by a finite-length window with an amplitude that varies smoothly and gradually toward zero at the edges. Windowing makes the endpoints of the waveform meet and, therefore, results in a continuous waveform without sharp transitions.

In 2D FFTs, some alternative implementations perform 1D window multiplications before each dimension's 1D FFT. In examples herein, a window pre-multiplication is performed with an unrolled 1D window before the entire M×N 2D FFT. Graph 802 shows a 2D Hanning window, while graph 804 shows an unrolled 1D 1024-point Hanning window. Graph 804 is the unrolled window that corresponds to graph 802, and graph 804 is an example of a window used herein for a 2D FFT. The 1D window is applied to the input samples for the 2D FFT processes described herein.

Figure 9:
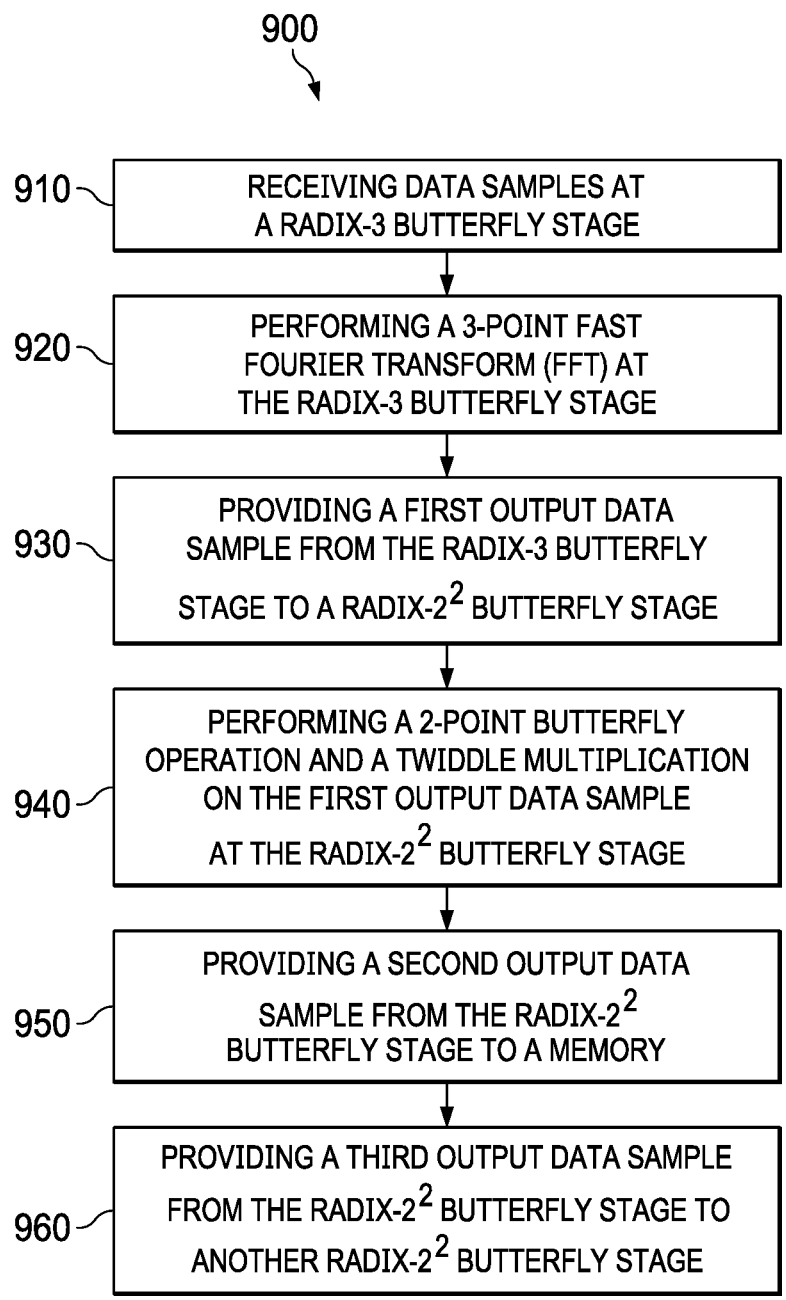
FIG. 9 is a flow diagram of a method for performing a $3\times2^N$ FFT in accordance with various examples.

FIG. 9 is a flow diagram of a method 900 for performing a $3 \times 2^N$ FFT in accordance with various examples herein. The steps of method 900 may be performed in any suitable order. The hardware components described above with respect to FIGS. 1-3 may perform method 900 in some examples.

Method 900 begins at 910, where data samples are received at a Radix-3 butterfly stage. Radix-3 butterfly stage may be a butterfly stage such as Radix-3 butterfly stage 102 in FIG. 1 or Radix-3 butterfly stage 201 in FIG. 2. In examples herein, Radix-3 butterfly stage 102 repurposed the FIFOs 104A and 104B from the first two Radix-2 stages of FFT architecture 100. As described above, Radix-3 butterfly stage 102 may also be reconfigured to perform a 2D FFT in some examples.

Method 900 proceeds to 920, where a 3-point FFT is performed at the Radix-3 butterfly stage. Radix-3 butterfly stage 102 receives three inputs per clock cycle, one from an input sample and two other samples from FIFO 104 A and FIFO 104 B as shown in FIG. 1, and performs FFT operations on the samples as described above.

Method 900 proceeds to 930, where a first output data sample is provided from the Radix-3 butterfly stage to a Radix-$2^2$ butterfly stage. As shown in FIG. 1, Radix-3 butterfly stage 102 may be configured to provide its output data samples to any appropriate Radix-2 or Radix-$2^2$ stage, depending on the size of the FFT being performed. For example, for a $3 \times 2^{10}$ FFT, the output of Radix-3 butterfly stage 102 is provided to the $2^{10}$ Radix-2 butterfly stage 106 stage, which is Radix-2 butterfly stage 106C. In another example, for a $3 \times 2^6$ FFT (e.g., a 192 point FFT), the output of Radix-3 butterfly stage 102 is provided to the $2^6$ Radix-2 butterfly stage 106 stage, which is Radix-2 butterfly stage 106G.

Method 900 proceeds to 940, where a 2-point butterfly operation and a twiddle multiplication is performed on the first output data sample at the Radix-$2^2$ butterfly stage. The Radix-$2^2$ butterfly stage receives one data sample per clock cycle from the Radix-3 butterfly stage and performs the butterfly operations and twiddle multiplications on the received data samples, as described above. Butterfly operations and twiddle multiplications may be performed at alternate Radix-$2^2$ butterfly stages in some examples.

Method 900 proceeds to 950, where each Radix-$2^2$ butterfly stage provides a second output data sample, where the second output data sample is stored in memory. Method 900 proceeds to 960, where each Radix-$2^2$ butterfly stage provides a third data sample to the next Radix-$2^2$ butterfly stage. The process may continue for each subsequent stage until the data samples have moved through the entire FFT architecture, and the third output data sample is provided from the last Radix-$2^2$ butterfly stage. In examples herein, the Radix-3 or Radix-$2^2$ butterfly stages may also be reconfigured as described above to perform 2D FFTs or FFTs greater than 2D. Also, Radix-$2^2$ butterfly stages may be reconfigured to operate as Radix-2 butterfly stages according to the type of FFT operations performed.

Examples herein provide a number of advantages. The examples described herein provide an FFT architecture that is both reconfigurable and area-efficient. The Radix-$2^2$ butterfly structure uses fewer complex multipliers than Radix-2 butterfly structures, which reduces area usage. FFTs may be performed that are $2^N$ FFTs or $3 \times 2^{N-1}$ FFTs. FIFO RAM for the Radix-3 butterfly stage is shared with the top two Radix-2 butterfly stages, which also reduces area usage. The FFT engines described herein are reconfigurable, and may compute a $3 \times 2^N$ point FFT where $1 \leq N \leq 10$, or may compute a $2^N$ point FFT where $1 \leq N \leq 12$.

Also, native 2D or higher dimension FFTs may be performed using the hardware described herein using Radix-3 and Radix-$2^2$ butterfly stages. Windowing is available for 2D FFTs by unrolling a 2D window into a long 1D window before performing the FFT.

By providing the ability to perform $3\times2^N$ FFTs instead of just $2^N$ FFTs, the examples herein have lower power and RAM usage than alternative solutions. Zero-padding is used to increase the data samples to powers of 2 when only $2^N$ FFTs are available. With $3\times2^N$ FFTs, users receive flexible FFT size and chirp timing options. The native 2D FFTs performed using the hardware described herein are faster and use less power than systems that use only Radix-2 butterfly structures.

The term "couple" is used in this application. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
    a Radix-3 butterfly circuit, including:
        a first first-in-first-out (FIFO) input configured to couple to a first FIFO;
        a first adder and a first subtractor coupled to the first FIFO input;
        a second FIFO input configured to couple to a second FIFO;
        a second adder and a second subtractor coupled to the second FIFO input;
        an input terminal coupled to the first adder and the first subtractor;
        a first scaler coupled to the second adder and a first multiplexer;
        a second scaler coupled to a third adder and a second multiplexer; and
        a third scaler coupled to a third subtractor and a third multiplexer, wherein an output of the first multiplexer is coupled to a complex multiplier, an output of the second multiplexer is coupled to a second FIFO output that is configured to couple to the second FIFO, and an output of the third multiplexer is coupled to a first FIFO output that is configured to couple to the first FIFO.

2. The system of claim 1, further comprising:
    a state counter coupled to the first multiplexer, the second multiplexer, and the third multiplexer.

3. The system of claim 1, further comprising:
    a counter configured to provide an address for a twiddle lookup table.

4. The system of claim 3, wherein the complex multiplier is configured to multiply an output sample from the first multiplexer with a weighting factor from the twiddle lookup table.

5. The system of claim 3, further comprising:
    a two-dimensional (2D) fast Fourier transform (FFT) converter configured to zero out a bit of the counter to perform a 2D FFT.

6. The system of claim 1, wherein the input terminal is configured to receive an input sample for an FFT.

7. The system of claim 1, wherein the complex multiplier is configured to output a sample to a next stage of an FFT architecture.

8. The system of claim 1, wherein the Radix-3 butterfly circuit is coupled to a Radix-$2^2$ butterfly stage to perform $3\times2^N$ point FFT.

9. The system of claim 8, wherein the first FIFO is a FIFO of a first Radix-$2^2$ butterfly stage, and the second FIFO is a FIFO of a second Radix-$2^2$ butterfly stage.

10. A system, comprising:
    a multi-dimensional Radix-$2^2$ butterfly architecture, including:
    a first butterfly stage including:
        a first first-in-first-out (FIFO) input configured to couple to a first FIFO;
        a first adder and a first subtractor coupled to the first FIFO input;
        an input terminal coupled to the first adder and the first subtractor;
        a first multiplexer coupled to the first adder; and
        a second multiplexer coupled to the first subtractor, wherein an output of the first multiplexer is coupled to a third multiplexer, and an output of the second multiplexer is coupled to a first FIFO output that is configured to couple to the first FIFO; and
    a second butterfly stage including:
        a second FIFO input configured to couple to a second FIFO;
        a second adder and a second subtractor coupled to the second FIFO input;
        an input terminal coupled to the second adder and the second subtractor;
        a fourth multiplexer coupled to the second adder; and
        a fifth multiplexer coupled to the second subtractor, wherein an output of the fourth multiplexer is coupled to a complex multiplier, and an output of the fifth multiplexer is coupled to a second FIFO output that is configured to couple to the second FIFO.

11. The system of claim 10, further comprising:
    a first counter coupled to the first multiplexer, the second multiplexer, and the third multiplexer; and
    a second counter coupled to the fourth multiplexer and the fifth multiplexer.

12. The system of claim 11, wherein the second counter is configured to provide an address for a twiddle lookup table.

13. The system of claim 12, wherein the complex multiplier is configured to multiply an output sample from the fourth multiplexer with a weighting factor from the twiddle lookup table.

14. The system of claim 13, further comprising:
    a two-dimensional (2D) fast Fourier transform (FFT) converter configured to zero out a bit of the second counter to perform a 2D FFT.

15. The system of claim 13, further comprising:
a Radix-2 converter configured to zero out a bit of the second counter to convert the second butterfly stage to a Radix-2 butterfly stage.

16. The system of claim 15, wherein the multi-dimensional Radix-$2^2$ butterfly architecture is configured to perform an FFT greater than two dimensions by:
suppressing N least significant bits of the twiddle lookup table address, where N is a sum of lower dimension log 2 sizes; and
reconfiguring a butterfly stage to a Radix-2 butterfly stage at a stage transition.

17. A method, comprising:
receiving data samples at respective inputs of a Radix-3 butterfly stage that includes first and second multiplexers, the data samples including a new data sample, a first feedback data sample output by the first multiplexer based on processing of a previous data sample, and a second feedback data sample output by the second multiplexer based on processing of the previous data sample;
performing a 3-point fast Fourier transform (FFT) at the Radix-3 butterfly stage;
providing a first output data sample from the Radix-3 butterfly stage to a Radix-$2^2$ butterfly stage;
performing a 2-point butterfly operation and a twiddle multiplication on the first output data sample at the Radix-$2^2$ butterfly stage;
providing a second output data sample from the Radix-$2^2$ butterfly stage to a memory; and
providing a third output data sample from the Radix-$2^2$ butterfly stage to another Radix-$2^2$ butterfly stage.

18. The method of claim 17, further comprising:
performing a bit reversal on an output data sample for a $3 \times 2^N$ one-dimensional (1D) FFT or a $3 \cdot 2^M \times 2^N$ two-dimensional (2D) FFT.

19. The method of claim 17, further comprising:
performing a window pre-multiplication with an unrolled 1D window before performing a 2D FFT.

20. The method of claim 17, further comprising:
reconfiguring the Radix-3 butterfly stage to perform a two-dimensional (2D) FFT by zeroing a bit in a first counter in the Radix-3 butterfly stage;
reconfiguring the Radix-$2^2$ butterfly stage to perform a 2D FFT by zeroing a bit in a second counter in the Radix-$2^2$ butterfly stage; and
performing a $3 \cdot 2^M \times 2^N$ point FFT.

* * * * *